United States Patent

[11] 3,618,626

| [72] | Inventor | Anthony Russo<br>Hacienda Heights, Calif. |
|---|---|---|
| [21] | Appl. No. | 7,801 |
| [22] | Filed | Feb. 2, 1970 |
| [45] | Patented | Nov. 9, 1971 |
| [73] | Assignee | Ventro Machine Products, Inc.<br>Buena Park, Calif. |

[54] SAFETY VALVE FOR COMPRESSED GAS CYLINDER
1 Claim, 3 Drawing Figs.

[52] U.S. Cl............................................... 137/68, 137/498
[51] Int. Cl............................................... F16k 13/04
[50] Field of Search............................. 137/68, 71, 459, 460, 461, 462, 484.4, 489.3, 517, 797, 513.5, 513.3, 498

[56] References Cited
UNITED STATES PATENTS

| 1,187,537 | 6/1916 | Loomis.......................... | 137/513.5 |
|---|---|---|---|
| 2,179,144 | 11/1939 | Buttner........................ | 137/517 |
| 2,229,893 | 6/1941 | Hubka........................... | 137/462 |
| 2,245,271 | 6/1941 | Guill............................. | 137/498 X |
| 2,781,775 | 2/1957 | Merrill.......................... | 137/498 |
| 2,864,400 | 12/1958 | Wiegel.......................... | 137/498 X |
| 3,111,138 | 11/1963 | Humphreys et al........... | 137/513.5 X |
| 3,122,162 | 2/1964 | Sands............................ | 137/498 |
| 2,219,897 | 10/1940 | Hooper et al................. | 137/519 X |
| 3,326,233 | 6/1967 | Perruzzi........................ | 137/519 X |
| 3,438,392 | 4/1969 | Wilson.......................... | 137/517 |

Primary Examiner—M. Cary Nelson
Assistant Examiner—Robert J. Miller
Attorney—Lyon & Lyon ABSTRACT: The body of a conventional valve assembly for controlling flow from a compressed gas cylinder is extended within the cylinder to receive a safety valve. Should the exposed control valve be damaged, escape of gas at abnormally high-flow rates is prevented by the safety valve, the latter moving by venturi effect against the action of a spring to restrict the rate of escaping gas to a safe value. When gas ceases to escape either because of repair of the control valve, or depletion of the gas supply, the spring returns the safety valve to its initial position.

PATENTED NOV 9 1971

3,618,626

INVENTOR
ANTHONY RUSSO
BY
Lyon & Lyon
ATTORNEYS

SAFETY VALVE FOR COMPRESSED GAS CYLINDER

This invention relates to valves for controlling flow from compressed gas cylinders, for example, conventional steel cylinders containing oxygen, acetylene, helium, carbon dioxide, or other gasses under pressure. Conventional flow control valves for such cylinders project exteriorly from the upper end of such cylinders. The exposed position of the conventional valve assembly makes it possible for it to be damaged or broken off altogether if the heavy steel cylinder should fall over and strike the valve assembly on a fixed object. Such an accident might have disastrous consequences, since an abnormally high-flow rate of gas escaping from the cylinder might cause the cylinder to move rapidly by reaction in a direction opposite to that of the escaping gas.

In accordance with this invention, the body portion of the conventional control valve assembly is extended within the cylinder to receive a safety valve. This valve is arranged to move by venturi effect whenever the rate of escape of gas from the cylinder reaches an abnormally high value. The valve then moves against the action of a spring to restrict the rate of flow of escaping gas to a safe value but below that which might cause the cylinder to move by reaction thrust. The safety valve does not shut off flow altogether, and so the gas continues to escape from the cylinder until the control valve assembly is repaired or until substantially all of the gas has escaped from the cylinder. The spring then returns the safety valve to its normal inoperative position.

Other and more detailed objects and advantages will appear hereinafter.

Figure 1:
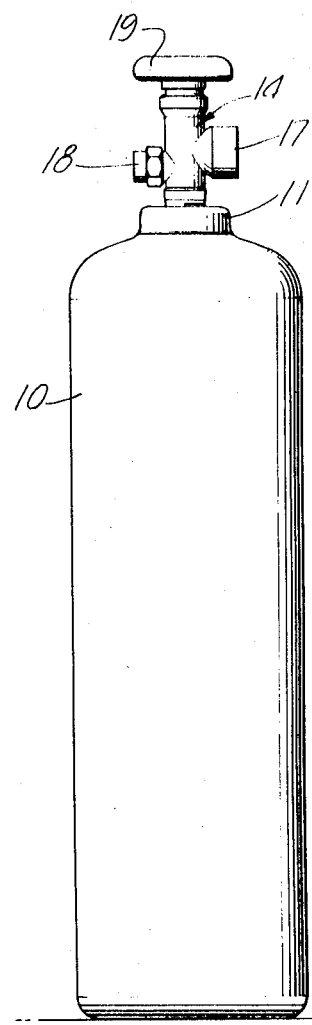
FIG. 1 is a side elevation of a conventional pressed gas cylinder and conventional control valves.

Referring to the drawings, the compressed gas cylinder 10 is of conventional type, formed of metal, and having a boss 11 at its upper end provided with internal threads 12. A control valve assembly generally designated 14 has a body 15 provided with external threads 16 adapted to engage the internal threads 12. A portion of the body 15 above the position of the threads 16 is conventional and includes valve parts which regulate the escape of gas through the discharge connection 17. Another connection 18 for a pressure gage, not shown, is also provided. The exposed manually operated valve handle 19 controls the operation of the valve assembly 14 in a conventional manner.

The valve body 15 has a central passage 21 through which gas passes from the interior of the cylinder 10 and which passage 21 is controlled by the conventional valve assembly 14. In accordance with this invention, the valve body 15 is provided with a tubular extension 22 on the opposite side of the external threads 16 from the control valve assembly 14. This extension 22 projects into the interior of the gas cylinder 10 and is provided with an enlarged bore 23 and a counterbore 24.

An axially movable safety valve element 25 is slidably mounted in the bore 23 and is provided with a flange 26 which slides within the counterbore 24. A coil compression spring 27 is positioned within the counterbore 24 and acts against the flange 26. A split retainer ring 32 is received within a groove 28 in the counterbore 24 and serves as a stop to limit downward travel of the valve element 25 under the force of the spring 27. Ports 29 are provided in the sleeve extension 22 and communicate between the interior of the cylinder 10 and the bore 23. When the imperforate valve element 25 is in the "open" position shown in FIG. 2, the upper end 30 of the valve element 25 lies below the ports 29 so that the passage 21 is in open communication through the ports 29 with the interior of the compressed gas cylinder 10.

If the control valve assembly 14 should be damaged through accident, the rush of gas through the ports 29 and into the bore 23 and passage 21 produces a zone of low pressure just above the safety valve element 25, in accordance with the well-known aspirator or venturi effect, with the result that the valve element 25 moves upward against the force of the spring 27 until its upper end 30 lies above the position of the ports 29. The gas flow through the ports 29 is very materially restricted, and accordingly the rate of flow of gas through the passage 21 is reduced to a safe level. The valve element 25 remains in its upper "closed" position, as shown in FIG. 3, because the pressure acting on the lower face of the valve is greater than the pressure acting on the upper end 30.

Figure 3:
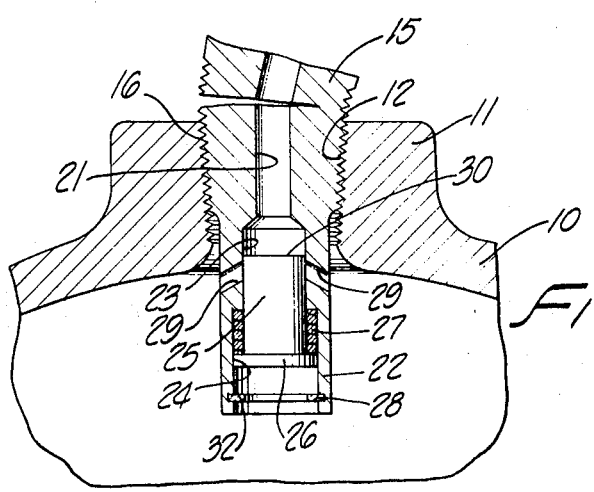
FIG. 3 is a sectional view similar to FIG. 2, showing the safety valve in closed position after the control valve has been broken away in an accident.

The valve element 25 in its closed position does not completely prevent escape of gas through the passage 21 because the valve element 25 has a cylindrical outer portion which has a sliding fit within the bore 23, and the clearance between the valve element 25 and the bore 23 permits escape of some gas even when the parts are in the position shown in FIG. 3.

Figure 2:
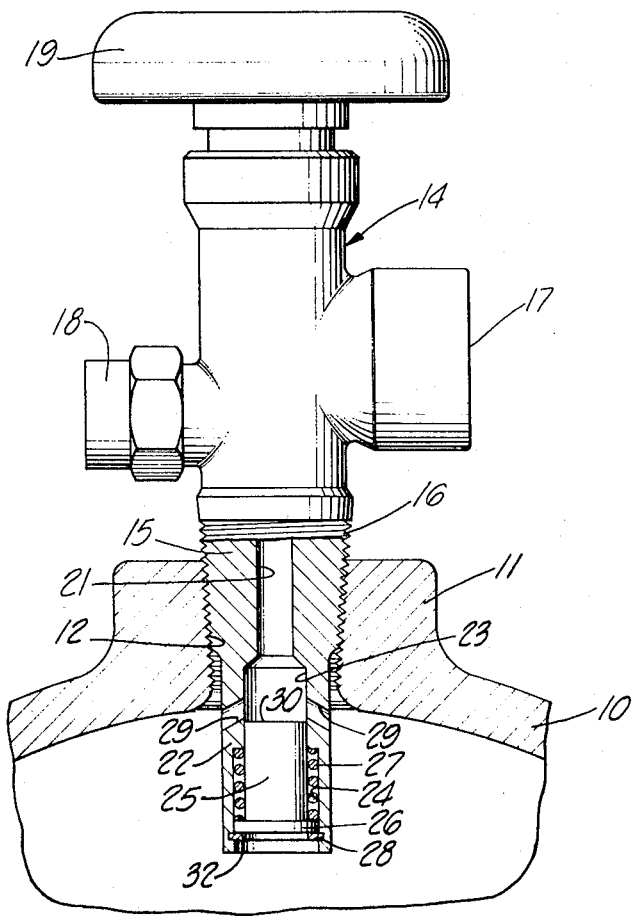
FIG. 2 is a sectional elevation showing a portion of the conventional control valve, together with the safety valve embodying this invention, the valve being shown in open inoperative position.

Should repair of the damaged valve assembly 14 be accomplished or if flow through the passage 21 is prevented by some other means, the increase in pressure in the passage 21 causes the valve element 25 to move back to its open position, as shown in FIG. 2, under action of the spring 27.

Having fully described my invention, it is to be understood that I am not to be limited to the details herein set forth but that my invention is of the full scope of the appended claims.

I claim:

1. For use with a movable compressed gas cylinder having an internally threaded outlet, a valve assembly comprising, in combination: a valve body having an externally threaded portion adapted for connection to said threaded outlet, a first portion of the valve body being positioned on one side of said externally threaded portion, said first portion being adapted to project exteriorly of said gas cylinder and having exposed valve parts for manually controlling normal flow of gas from the gas cylinder, a second portion of the valve body being positioned on the other side of said externally threaded portion, said second portion comprising a sleeve extension adapted to project interiorly into said gas cylinder and having a flow passage communicating with the external valve parts, said sleeve extension being provided with at least one lateral port, an imperforate valve element movable in said sleeve extension from an open position permitting flow through said port into said passage to a closed position substantially restricting, although not completely preventing, flow through said port and passage, resilient means acting to move said valve element to its open position, said valve element being moved by venturi effect to its closed position against the action of said resilient means in the event of breakage of the external first portions of said valve body, thereby preventing bodily movement of the gas cylinder by reaction force of an abnormally high flow rate through said passage.

* * * * *